United States Patent [19]

Sloan

[11] Patent Number: 5,779,169
[45] Date of Patent: Jul. 14, 1998

[54] AIRCRAFT ENGINE INLET HOT GAS AND FOREIGN OBJECT INGESTION REDUCTION AND PITCH CONTROL SYSTEM

[75] Inventor: Mark L. Sloan, Newcastle, Wash.

[73] Assignee: The Boeing Company, Seattle, Wash.

[21] Appl. No.: 573,047

[22] Filed: Dec. 15, 1995

[51] Int. Cl.$^6$ .......................... B64C 15/14; B64C 29/00; B64D 33/02
[52] U.S. Cl. .......................... 244/12.3; 244/12.5; 244/52; 244/53 B; 244/76 J; 239/265.25; 239/265.29
[58] Field of Search .................. 244/12.1, 12.3, 244/12.5, 76 J, 53 B, 52; 239/265.19, 265.27, 265.29, 265.25

[56] References Cited

U.S. PATENT DOCUMENTS

| | | | |
|---|---|---|---|
| 3,073,548 | 1/1963 | Marsh | 244/12.5 |
| 3,160,368 | 12/1964 | Young et al. | 244/76 J |
| 3,387,456 | 6/1968 | Feder et al. | 244/53 B X |
| 3,447,764 | 6/1969 | Denning et al. | 244/53 B |
| 3,784,130 | 1/1974 | Robinson | 244/76 J |
| 3,823,897 | 7/1974 | Bloomquist | 244/12.5 X |
| 4,004,755 | 1/1977 | Hooper | 244/12.5 |
| 4,482,109 | 11/1984 | DuPont | 244/12.5 |

FOREIGN PATENT DOCUMENTS

2050260  1/1981  United Kingdom ................ 244/12.3

*Primary Examiner*—William Grant
*Attorney, Agent, or Firm*—Thomas W. Hennen

[57] ABSTRACT

An aircraft for vertical or short take off and landing operations having two main lift nozzles, both positioned at or near the aircraft center of gravity utilizes one or more jet screen nozzles, arranged in a variety of shapes and combinations, discharging bypass air from a position forward of the center of gravity, and a variable pitch nozzle discharging engine exhaust gas mixed with bypass air from a position aft of the center of gravity, to achieve pitch control while airborne in vertical take off or landing mode. The jet screen nozzle also prevents or reduces ingestion of mixed hot exhaust gas and bypass air discharged through the main lift nozzles. The jet screen nozzle further prevents or reduces ingestion of foreign object debris disturbed by the vertical lift discharge flowing from the main lift nozzles. Lift improvement devices are deployed during short or vertical takeoff and landing operations to act as air dams to cause main lift nozzle discharge striking the ground and returning to the aircraft as a fountain flow and flowing against the lower surface of the aircraft, to separate from the aircraft surface and return toward the ground. This enhances lift effect on the aircraft while avoiding further hot exhaust gas flow along the aircraft skin surface and eventually into the aircraft engine inlet. A control system modulates the jet screen nozzle and aft pitch control nozzle, along with the cruise nozzle, main lift nozzles and other control nozzles so that total engine discharge flow area remains substantially constant through a range of pitch control and other maneuvering commands.

16 Claims, 11 Drawing Sheets

AIRCRAFT ENGINE INLET HOT GAS AND FOREIGN OBJECT INGESTION REDUCTION AND PITCH CONTROL SYSTEM

BACKGROUND OF THE INVENTION

1. Field of the Invention

This invention pertains to systems for use on aircraft. With greater particularity, this invention pertains to systems for reducing the possibility of hot exhaust gas and foreign body ingestion by the engine and also for providing aircraft pitch control. With the greatest particularity, the present invention pertains to such a system in a short or vertical take-off and landing aircraft for use while operating in critical low speed, low altitude maneuvers near a landing surface.

2. Description of Related Art

Gas turbine engine powered aircraft designed to perform short and vertical takeoffs and landings, often use vectored thrust to provide increased vertical lift. Such gas turbine engines require an inlet to provide oxygen rich air to the front of the engine and produce large volumes of oxygen depleted exhaust gas which is discharged through a nozzle usually to the rear of the engine to produce thrust. The pressure of the exhaust gas is greater than atmospheric pressure so that as the exhaust gas passes and expands through the exhaust nozzle, the exhaust gases accelerate. This unbalanced exhaust gas pressure on the engine and nozzle produces a net thrust in the forward direction. Discharging the exhaust gas vertically downward similarly produces a reaction force tending to lift the aircraft off of the landing surface.

The velocity of the exhaust gas stream when directed vertically downward is sufficiently great to disturb loose debris that may reside on the landing surface. Such engines typically require large volumes of air flowing through an inlet, and such flow occasionally includes foreign bodies dislodged by the vertical discharge. Foreign bodies entering a high speed gas turbine engine may cause severe damage to the compressor and turbine blades. It is thus desirable in an aircraft designed for vertical or short takeoffs and landings utilizing a gas turbine engine, to prevent or reduce the chance that foreign bodies may be ingested into the engine during such takeoffs and landings.

Equally important, exhaust gas diverted and discharged vertically downward while an aircraft is on or near a landing surface, will strike the landing surface and turn back upward toward the aircraft, forming a fountain effect tending to lift the aircraft. Such exhaust gases have a temperature much higher than ambient air. The higher gas temperature means the exhaust gases are less dense than ambient air and would be much less efficient in a combustion chamber than cool ambient air. If such hot exhaust gases are ingested, engine thrust may decrease dramatically, leading to loss of aircraft control and even loss of the aircraft itself.

Unless appropriate measures are taken, this fountain of hot air can find its way to the engine air inlet. If ingested, the hot air will cause jet engine turbine temperatures to exceed predetermined temperature limits, in turn causing engine control equipment to sharply reduce fuel flow rate to the engine. The reduction in fuel flow rate prevents turbine blade overheating and resultant turbine blade damage, but also results in dramatic loss of thrust. This forced fuel flow reduction in order to maintain engine temperature within preset limits to maintain engine life, is not subject to override by the pilot, and will occur rapidly, leaving the pilot few options. Thermal distortion in the otherwise cool inlet air flow can also cause the engine compressor blades to stall. Compressor blade stall can result in an engine surge where pressurized gas within the engine surges back through the compressor, the jet engine losing all thrust. While operating only several feet above the ground, there is not sufficient time to restart the engine, and a crash or extremely hard landing may become inevitable. This loss of thrust would be serious in any situation, but in a military aircraft carrying armed munitions, this could be catastrophic.

Ideally during such landing and take off maneuvers, the gas turbine engine will only ingest clean, cool, oxygen rich ambient air and will discharge its exhaust gases vertically downward. In order to achieve this condition, aircraft designers have utilized jets of cool, high speed air, fed by compressed air lines, near the engine air inlet to form a barrier between ambient air and hot engine exhaust gases, thereby preventing exhaust gas ingestion. One example of such a system is found in U.S. Pat. No. 3,447,764 for *Aircraft With Jet Propulsion Engine* by Denning, et al. This patent describes structure which acts to prevent ingestion of hot engine exhaust gases as well as debris and other foreign bodies.

Another problem in vertical and short take-off and landing aircraft is that engine exhaust gases discharged vertically downward striking the landing surface, tend to then rise against the body of the aircraft and flow over its surface, eventually reaching the engine inlets where hot exhaust gas ingestion can occur. This path to hot gas ingestion escapes the barrier effects of compressed air jets mentioned above. One approach to solving this problem has been to provide gas diversion means to separate the flow from the aircraft body and direct it back toward the ground. An example of such a system may be found in U.S. Pat. No. 3,073,548 to R. B. Marsh for *VTOL Aircraft with Gas Diversion Means*.

An approach used by aircraft designers to solve the hot gas and foreign body ingestion problem has been to provide a combined air brake and deflector door near the engine inlet which may be deployed downward to deflect engine exhaust gases from vertical lift nozzles that may strike the ground and return to the aircraft body. This deflector door includes a supply of compressed air from the engine which it discharges through edge slots to further provide a curtain of cool air further confining the swirling hot engine exhaust gases and preventing their ingestion by the engine. An example of this design may be found in U.S. Pat. No. 4,004,755 to Ralph Spencer Hooper, for *VTOL Aircraft With Combined Air Brake And Deflector Door*. The concept of using compressed air to form a shield preventing ingestion of engine exhaust gases may be found in U.S. Pat. No. 3,387,456 to A. Feeder, et al. for *Aerodynamic Shield Device For VTOL Jet Aircraft Engine Exhaust*.

Although these prior designs sought to limit or control ingestion of hot engine exhaust gases by a gas turbine engine, and in some cases the ingestion of foreign bodies, these inventions did not also provide pitch control of the aircraft while in critical low altitude, low speed, takeoff and landing maneuvers. Prior attempts to protect gas turbine engines in vertical and short takeoff and landing aircraft from hot gas and foreign body ingestion, have been applied to aircraft utilizing four or more downwardly directed engine exhaust gas nozzles where maintaining pitch control of the aircraft has been less of a problem than in a two lift nozzle design.

Another pitch phenomenon also can plague delta wing aircraft designers. This condition is known as "aft pitch-down". It occurs in delta wing planform aircraft when exhaust gas flow from the lift fountain causes a low pressure area to form under the aft delta wing configuration adjacent to the lift fountain. The result of this event is that the aircraft pitches up in front as the aft end settles under atmospheric pressure on its large upper surface, to the point where the aircraft may become impossible to control.

The present invention is intended for use in aircraft having only a pair of downwardly directed main lift nozzles aligned laterally at the center of gravity where pitch control of the aircraft in vertical takeoff and landing mode becomes critical. In such aircraft the foregoing problems of hot gas and foreign body ingestion, as well as the problem of providing pitch control is solved by providing integrated lifting thrust, jet screen effect to prevent hot gas and foreign body ingestion, while providing pitch control all within a single aircraft propulsion system.

SUMMARY OF THE INVENTION

The present invention forms a part of an aircraft propulsion system that utilizes a single high pressure ratio bypass jet engine as the heart of that propulsion system. The jet engine, as is conventionally known, has a first stage compressor at the front of the engine connected to the second stage turbine at the aft end of the engine, and mounted for high speed rotation. Aft of the first stage compressor is the second stage compressor, also mounted for high speed rotation and connected to the first stage turbine just forward of the second stage turbine. The compressor stages and turbine stages comprise bladed wheels which act aerodynamically on air passing there though or are acted upon aerodynamically by exhaust gases passing there through. The first stage compressor and second stage turbine, as a connected unit, are termed a spool. The second stage compressor and first stage turbine, as a connected unit, are similarly termed a spool. The two spools are mounted about a common axis of rotation as is well known in the jet engine art.

Between the second stage compressor and first stage turbine is the combustion chamber where fuel is introduced into the compressed air flow and ignited to create large volumes of hot propulsion gas termed exhaust. The exhaust exits the engine, flows through the tailpipe and normally exits through the cruise nozzle to produce forward thrust.

A circumferential passageway provides a bypass route for some of the air compressed by the first stage compressor to avoid the second stage compressor and flow outside the combustion chamber to the aft end of the jet engine where the bypass air rejoins the air passing through the core of the engine. Air acted upon by the blades of the first compressor stage separates as some air flows through the second stage compressor and some is ducted parallel with the engine outside the walls of the second stage compressor and turbine stages. This bypass air does not mix with air going through the second stage compressor and turbine stages until that air exits at the rear of the engine as hot, oxygen depleted exhaust gas. The bypass air then mixes with the exhaust gas and cools it somewhat.

This propulsion system has two vertical lift nozzles, and an aft cruise nozzle for discharging mixed bypass air and engine exhaust. The centerlines of the two main lift nozzles are each at the same distance from the front of the aircraft, and are aligned vertically with the center of gravity of the aircraft as it rests on its landing gear, one on each side of the aircraft fuselage in a symmetrical arrangement that provides substantially equal flow characteristics through each nozzle.

The aft cruise nozzle is open for forward cruise flight, but can close completely to divert bypass air mixed with engine exhaust gases downward through the two main lift nozzles to provide vertical lift. The main lift nozzles can be closed completely and the cruise nozzle opened so that bypass air mixed with engine exhaust gases flows out the cruise nozzle when the aircraft is in forward cruise flight. Other smaller nozzles discharge bypass air selectively to maintain aircraft attitude in pitch, roll and yaw while hovering or traveling at low speed.

A control system monitors all nozzle conditions to ensure that the total discharge flow area of the engine remains substantially constant as various nozzles open and close in response to air crew flight commands. Thus, as the aft nozzle opens to transition from vertical takeoff or hover to forward cruise flight, the main lift nozzles close to maintain total engine discharge flow area constant. While in the critical phases of takeoff and landing, the pilot runs the engine at a high constant rotational speed with cruise nozzles or lift nozzles opened sufficiently to provide only the amount of thrust required, and merely needs to close the nozzles slightly and add fuel for efficient entry into emergency power maneuvers, should they become necessary, without waiting for engine spool up (increase its rotational speed).

Ingestion of hot gas and foreign objects while hovering close to a landing surface is minimized or prevented by use of a jet screen provided forward of the main lift nozzles. The jet screen is operative to project a sheet of relatively cool bypass air through the nozzle at supersonic velocity downward and forward to establish a protective air curtain which confines exhaust gases and deflects dislodged foreign bodies to prevent their entry into the engine inlet.

A second nozzle and valve positioned near the aircraft tail is operative to selectively discharge mixed exhaust gas and bypass air to provide a negative or tail upward pitching moment relative to the aircraft center of gravity. Wing tip mounted valves similarly provide control about the roll and yaw axes, although these wing tip valves are not considered part of the present invention. A control system modulates the jet screen and aft pitch control valve to control the magnitude of pitching moment while also modulating the wing tip valves, the main lift nozzles and the aft cruise nozzle to comply with control input commands while maintaining engine discharge flow area and engine rotational speed substantially constant.

Lift improvement devices, embodied in long rectangular plates pivotally positioned on the bottom surface of the aircraft, serve to separate flow of exhaust gas impinging upon a landing surface and returning to the aircraft bottom surface as a fountain flow tending to pressurize the lower surface of the aircraft. Their function is to prevent such hot exhaust gases from continuing to flow around the side of the aircraft and eventually into the engine inlet. The lift improvement devices are mounted on hinges that allow their movement between extended and retracted positions. The lift improvement devices are extended for takeoffs and landings, and are retracted for normal forward flight. The lift improvement devices could be deployed manually by the pilot as part of a landing or takeoff checklist procedure, or perhaps a backup emergency procedure, or could be controlled by an automated process that includes closing or opening the cruise nozzle and opening or closing the main lift nozzles. Standard mechanical, electromechanical, hydraulic or pneumatic components could be employed to power the lift improvement devices.

A bypass duct contains the air that bypasses the engine combustion chamber. The jet screen air is provided by a bypass duct offtake which attaches to the bypass duct and diverts a portion of the bypass air. The bypass duct offtake terminates in a jet screen nozzle that may be a variable area two-dimensional jet screen nozzle, configured in cross section as a wide, short rectangle. The jet screen nozzle may include a long forward lip oriented transverse to the longitudinal axis of the engine, right and left sidewalls and an aft moveable lip which is powered by an actuator between a closed position and a series of incrementally open positions leading to a full open position to control the volume mass flow rate of air through the jet screen nozzle. Alternate configurations of the jet screen nozzle have different cross sectional dimensions and features.

Accordingly, one object of the present invention is to provide protection from engine ingestion of exhaust gases which are less dense and hotter than is ambient air. Another object of the invention is to provide protection from engine ingestion of foreign bodies which may be dislodged by the action of the main lift nozzle discharge against a nearby landing surface. Yet another object of the present invention is to provide pitch control to enable a vertical or short takeoff and landing aircraft having only two main lift nozzles each located longitudinally at the aircraft center of gravity to maneuver in pitch. Another object of the invention is to provide a vertical or short takeoff and landing aircraft with lift improvement devices that interact with flows originating in the main lift nozzles to prevent gases discharged by the main lift nozzles from returning to the aircraft bottom and flowing up the side of the aircraft where they may be drawn into the engine inlet. Another object of the invention is to increase air pressure on the lower surface of the aircraft aft of the center of gravity to reduce or eliminate the aft pitch down effect (sometimes known as the "aft suck-down" effect).

BRIEF DESCRIPTION OF THE DRAWING

These and other objects of the invention will be better understood when the following specification is studied in conjunction with the appended drawing figures wherein.

DETAILED DESCRIPTION OF THE PREFERRED EMBODIMENT.

Figure 1:
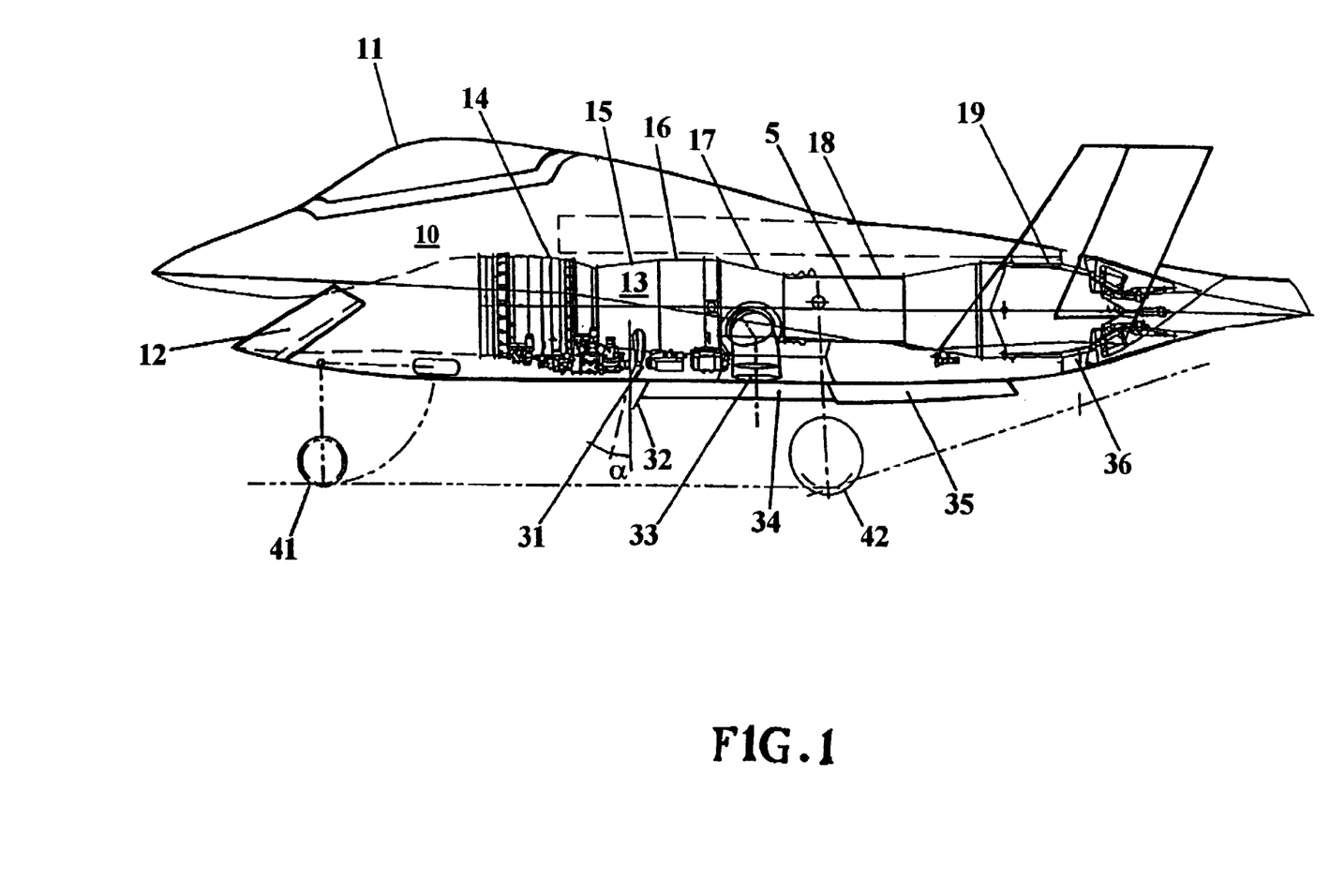
FIG. 1 is a side view partially in phantom, partially cut away, of a vertical or short takeoff and landing aircraft according to the invention.

Referring now to the drawings wherein like parts and elements are designated by like reference characters throughout the several figures, and in particular referring to FIG. 1, there is shown vertical or short takeoff and landing aircraft 10 having canopy 11 and engine air inlet 12. Aircraft 10 is powered by high pressure ratio bypass jet engine 13, having a longitudinal axis 5, and a compressor section 14 which provides bypass air through bypass duct 15. Just aft of bypass duct 15 is turbine section 16 and main lift nozzle plenum 17. Attached to main lift nozzle plenum 17 is tail pipe 18 which in turn connects with cruise nozzle 19.

Aircraft 10 is supported on the ground by nose landing gear 41 and main landing gear 42. Main landing gear 42 comprises right and left landing gear to provide a triangular support arrangement for aircraft 10.

Main lift nozzle plenum 17 provides mixed bypass air and engine exhaust gases either to tailpipe 18 or selectively to main lift nozzles represented in FIG. 1 by left main lift nozzle 33. A jet screen of pressurized air is provided through jet screen nozzle 31.

Forward left lift improvement device 34 and aft left lift improvement device 35 are duplicated on the right side of the aircraft to form a long inverted trough on the bottom of the aircraft when these lift improvement devices are deployed. Front lift improvement device 32, when deployed, extends from the forward ends of the right and left forward lift improvement devices and serves to separate fountain flow (resulting from main lift flow originating in the main lift nozzles impinging against a landing surface and returning as a fountain flowing up against the under surface of aircraft 10) from jet screen 53. Variable area pitch nozzle 36 positioned at the aft end of aircraft 10 is under control in coordinated operation with jet screen nozzle 31. As one nozzle opens, the other closes to properly modulate pitch and to maintain constant the discharge flow area of engine 13.

Figure 2:
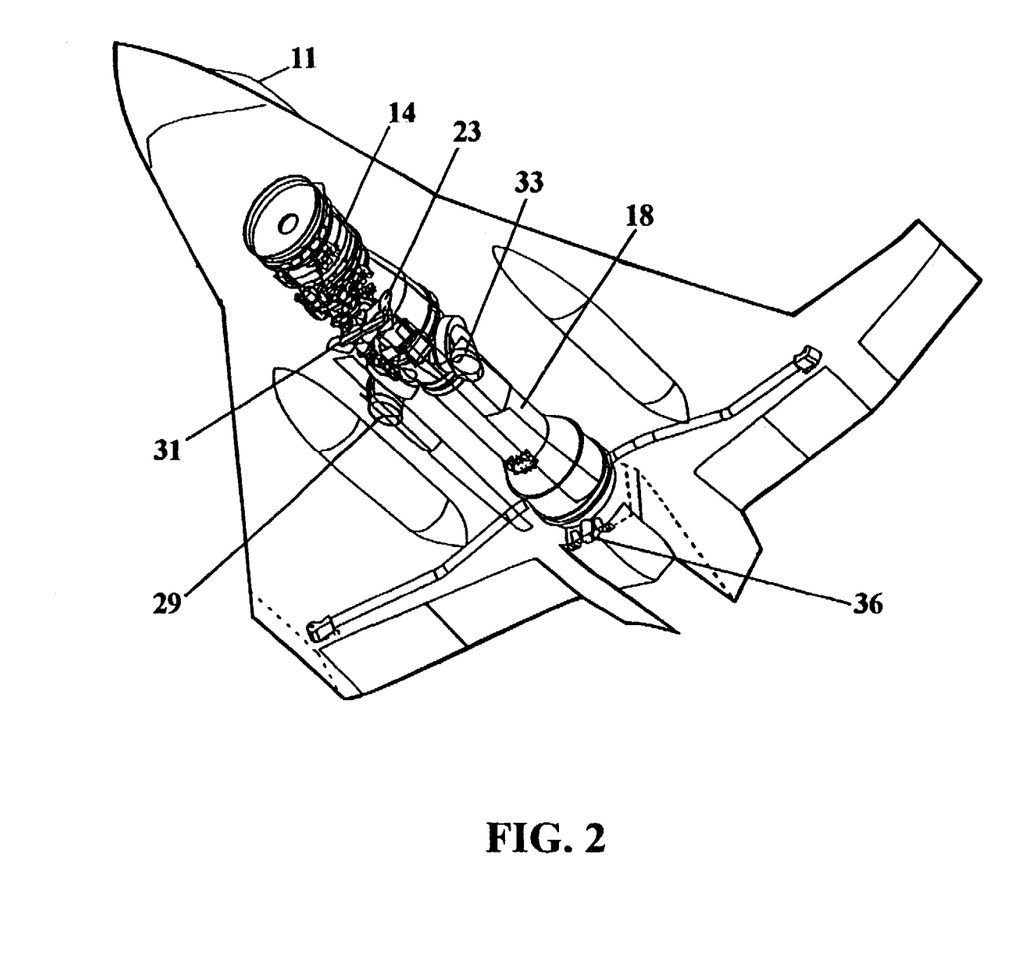
FIG. 2 is a bottom view, partially in phantom, partially cut away, of a vertical or short takeoff and landing aircraft according to the invention.

Referring now to FIG. 2, right main lift nozzle 29 comes into view. Also shown in FIG. 2 is bypass duct offtake 23 which serves to channel a portion of the bypass air to jet screen nozzle 31. Main lift nozzles 29 and 33 are designed to provide a swiveling capability so that as part of the take off or landing sequence they can be directed to various positions between vertically downward and aft, rotating through an angle of approximately 90 degrees. This swiveling capability enables the pilot to attain a forward velocity to provide aerodynamic wing support before making the change to cruise nozzle 19 thrust, and better enables horizontal maneuvering while in the hover mode without requiring pitch to extreme attitudes to gain horizontal movement.

Figure 3:
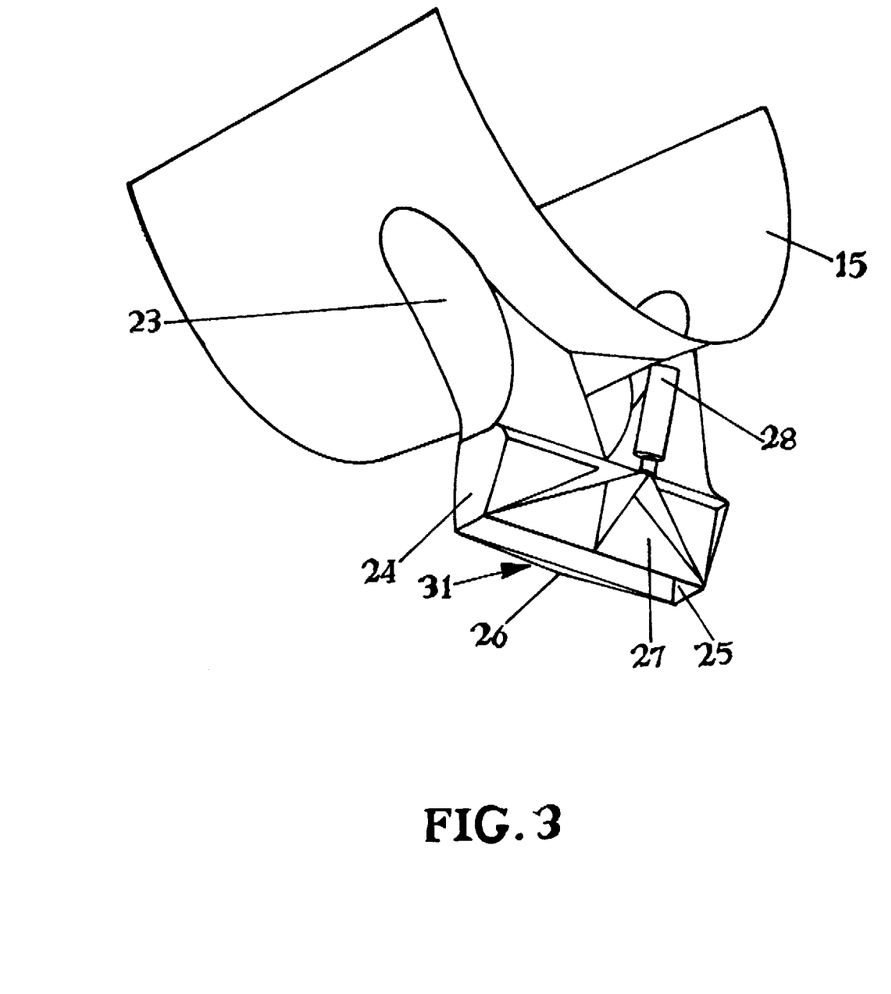
FIG. 3 is a perspective view of a bypass duct offtake and jet screen nozzle according to the invention.

Referring now to FIG. 3, bypass duct 15 is partially shown to illustrate the relationship between bypass duct offtake 23 and bypass duct 15. FIG. 3 further illustrates stationary forward lip 26 on jet screen nozzle 31 bounded on the right side by stationary right sidewall 25 and on the left by stationary left sidewall 24. Jet screen nozzle 31 also includes aft lip 27 which is movable between sidewalls 24 and 25. Aft lip 27 is controlled by aft lip actuator 28 which responds to commands from a control system to modulate the cross-sectional flow area of jet screen nozzle 31. Jet screen nozzle 31 is a single shutoff, variable area, convergent/divergent jet screen nozzle.

Gas flow through the main lift nozzles 29 and 33, when the cruise nozzle 19 is closed, is mostly hot exhaust gas mixed with bypass air. This bypass air flow is cooler than pure exhaust gas would be, although it is still quite warm. Exhaust gas is approximately 1,800 degrees Fahrenheit and 80 pounds per square inch above atmospheric pressure. By comparison, compressed bypass air flowing through the bypass duct 15 that feeds the bypass duct offtake 23 is not exhaust gas and is relatively cool at 450 degrees Fahrenheit and about 70 pounds per square inch above atmospheric pressure. Jet screen nozzle 31 is variable in discharge area but discharges in a constant direction downwardly relative to aircraft 10.

Figure 4:
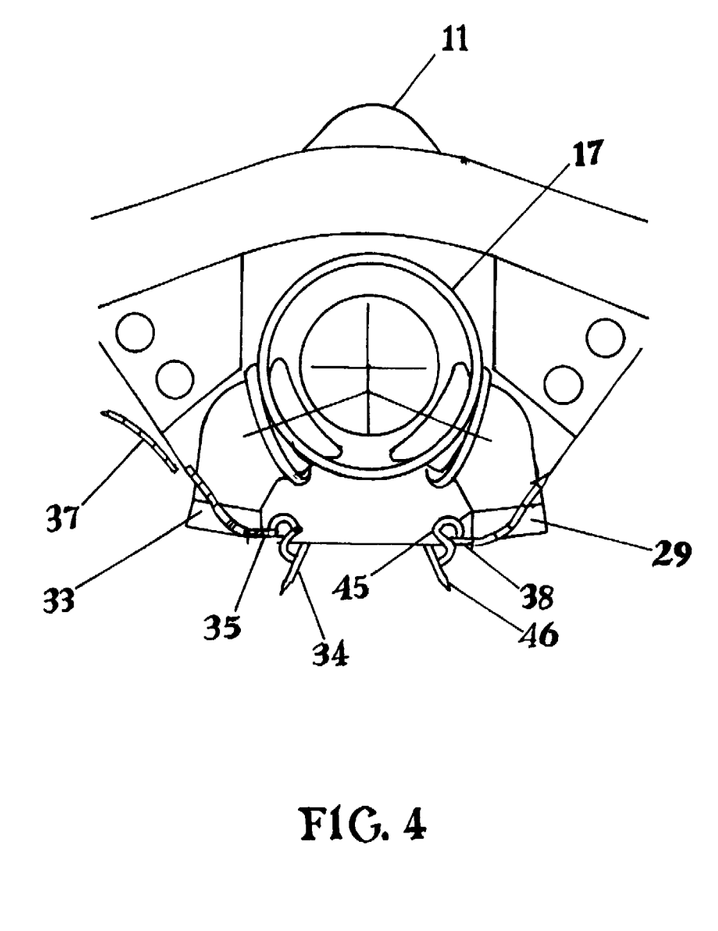
FIG. 4 is a sectional view of a vertical or short takeoff and landing aircraft showing the main lift nozzle structure and lift improvement devices in the deployed and retracted positions.

FIG. 4 illustrates left main lift nozzle 33 and right main lift nozzle 29, both attached to main lift nozzle plenum 17. FIG. 4 also illustrates main lift nozzle door 37 in the open position to permit main lift nozzle 33 to discharge engine exhaust gas and bypass air to produce lift. During normal forward operation, main lift nozzle door 37 is closed to provide an aerodynamically efficient surface. Similar structure operates on the right side of aircraft 10 to cover right main lift nozzle 29 while in forward flight configuration.

Forward left and right lift improvement devices 34, 46 are illustrated in FIG. 4 in the deployed position for use during vertical or short takeoffs and landings. During normal forward flight, the lift improvement devices are all retracted to provide a smooth and aerodynamically efficient surface. Aft left and right, lift improvement devices 35, 38 are shown in FIG. 4 in the retracted position. During typical operations all lift improvement devices would be deployed for takeoff or landing and all lift improvement devices would be retracted to provide an aerodynamically efficient surface for normal forward flight operation. Lift improvement devices are hinged as by lift improvement device hinge 45 shown in FIG. 4 to provide the appropriate restrained pivoting motion and may be powered by any conventional mechanical means, such as by hydraulic cylinders, or electromechanical mechanisms, as is well known in the art.

Figure 5:
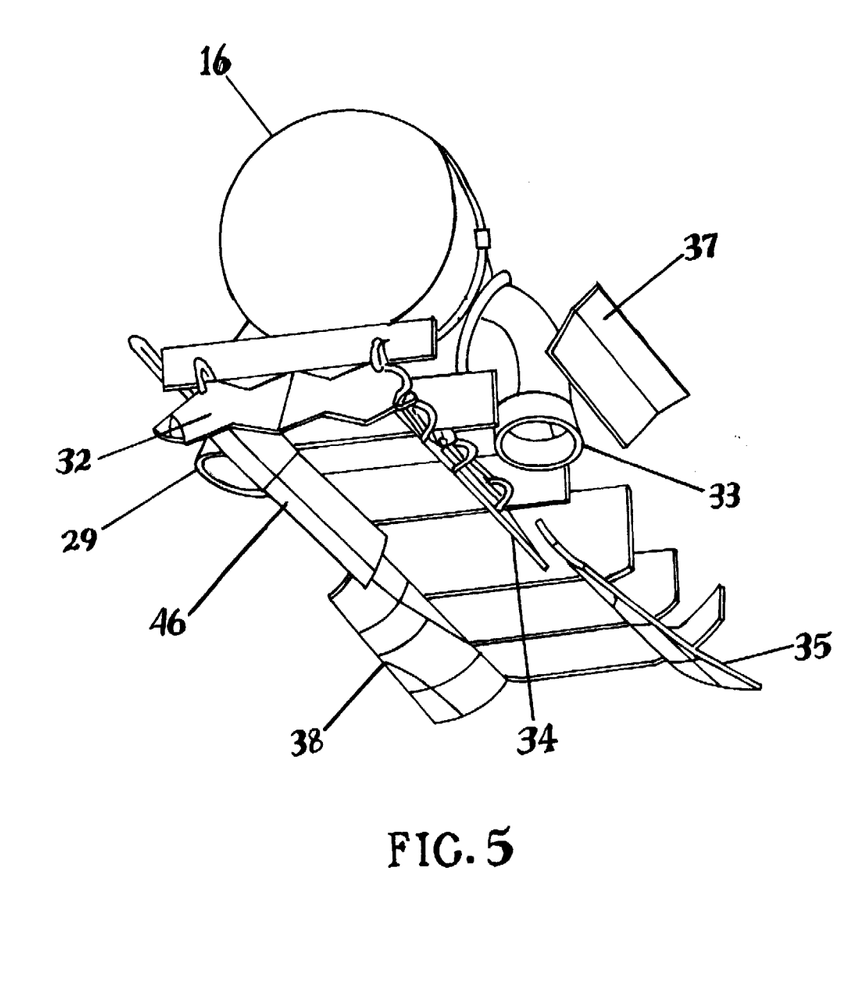
FIG. 5 is a perspective view, schematic in nature, of the lift improvement devices and main lift nozzles according to the invention.

Referring now to FIG. 5, there is shown schematically the relative arrangement of the various lift improvement devices 32, 34, 35, 38, and 46. Also shown is the relative arrangement of main lift nozzle door 37 with respect to main lift nozzle 33, and main lift nozzle 29. The portion of engine 13 just forward of main lift nozzle plenum 17 is turbine section 16 shown somewhat schematically in FIG. 5.

Figure 6:
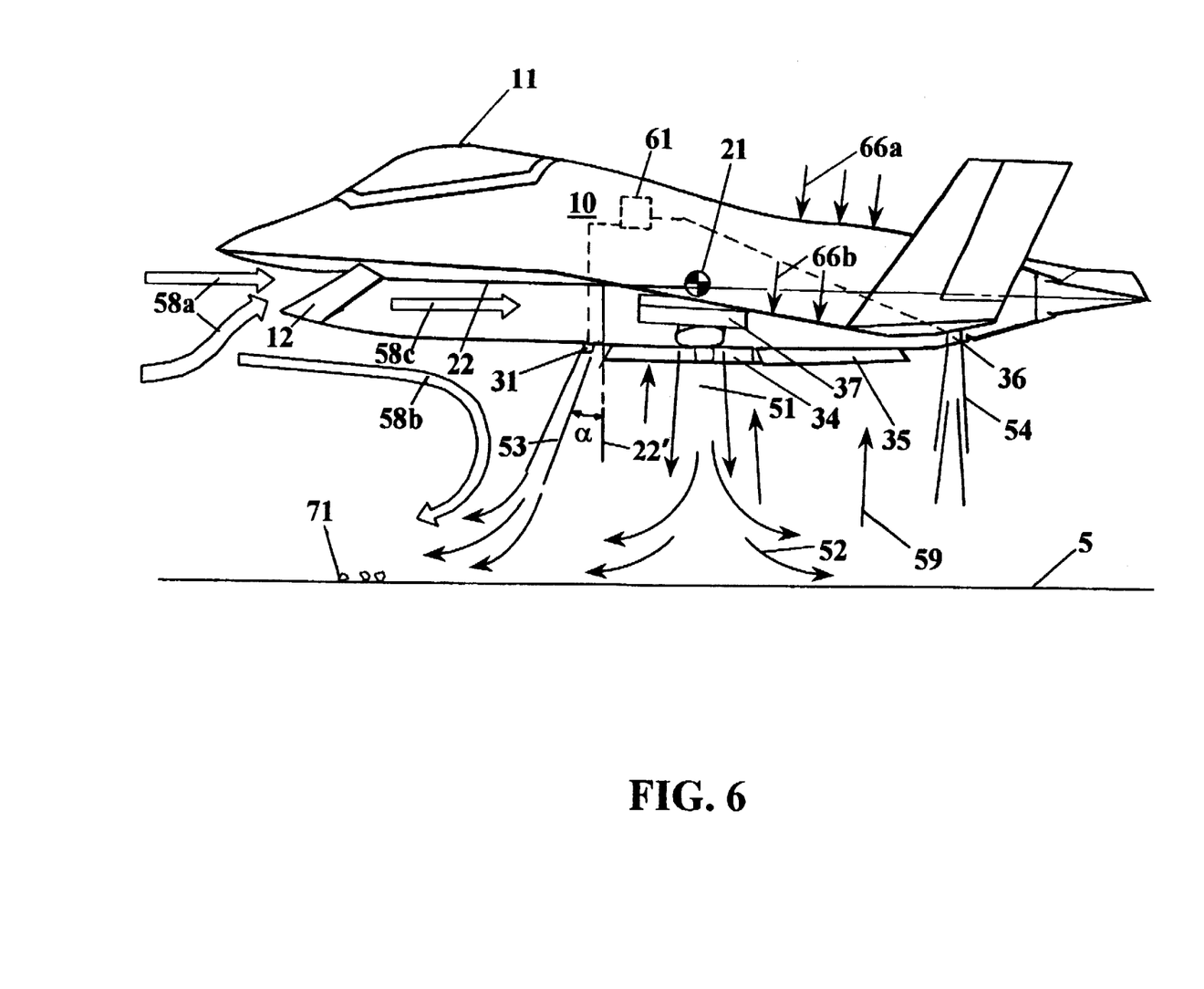
FIG. 6 is a side view of a vertical or short takeoff and landing aircraft operating close to a landing surface.

FIG. 6 illustrates aircraft 10 during low altitude vertical maneuvering wherein aircraft 10 is supported by reaction forces resulting from vertical lift discharge from main lift nozzle 33 and the corresponding vertical lift discharge from right main lift nozzle 29, collectively identified as vertical lift discharge 51. As aircraft 10 nears landing surface 5, vertical lift discharge 51 begins to impinge upon landing surface 5, producing turbulent air flow shown by turbulence 52. FIG. 6 also illustrates jet engine center line 22 and a line perpendicular to that center line indicated by 22'. FIG. 6 also illustrates aircraft center of gravity 21.

Jet screen nozzle 31 is shown producing jet screen 53 which comprises relatively cool (approximately 450° Fahrenheit) air diverted from the bypass duct 15. As jet screen 53 (high pressure air discharged through jet screen nozzle 31) comes in contact with landing surface 5 it tends to spread forward of aircraft 10 in a horizontal sheet. Eventually, this horizontal sheet that is warmer than ambient air begins to rise at a distance from the aircraft. Discharge of jet screen 53 causes a reaction force tending to lift the front of aircraft 10 or cause it to rotate in positive pitch about its center of gravity. Variable area pitch nozzle 36, under control of control system 61, selectively produces pitch nozzle discharge 54 thereby contributing a reaction force causing a negative moment about center of gravity 21 and tending to pitch the nose of aircraft 10 downwardly, thereby balancing the positive pitch from jet screen 53.

By modulating jet screen nozzle 31 and variable area pitch nozzle 36, an operator may maintain pitch control of aircraft 10. Control system 61 operatively connected to jet screen nozzle 31 and variable area pitch nozzle 36, as well as to other engine and control functions, enables the operator to maintain control of aircraft 10 by coordinated opening and closing of different nozzles and valves while maintaining a substantially constant flow discharge area from engine 13.

When aircraft 10 approaches landing surface 5, ground effects caused by interaction of hot vertical lift discharge 51 on landing surface 5, result in reduced air pressure on the bottom surface of aircraft 10. Because aircraft 10 has a somewhat triangular planform design, when viewed from above, the surface area of aircraft 10 is greater aft of center of gravity 21 than it is forward of center of gravity 21. The reduced pressure on the bottom surface of aircraft 10 causes what is known "aft pitch-down" where atmospheric pressure 66a and 66b operates to cause the back of aircraft 10 to be drawn downward and the nose of aircraft 10 to pitch upwardly. As will be explained below, interaction between vertical lift discharge 51 and jet screen 53 results in increased pressure on the bottom surface of aircraft 10 and reduces the so-called "aft pitch-down" effect.

Scaled tests and computer simulations have verified that when aircraft 10 is operating near landing surface 5 with jet screen 53 in operation, clean ambient air is drawn into inlet 12 as shown by large arrows 58a and also flows aft along the body of aircraft 10 as shown by arrow 58c. Arrow 58b illustrates how clean ambient air circulates under the nose of aircraft 10 and avoids mixing with vertical lift discharge turbulence 52 because of jet screen 53.

Potentially damaging foreign objects 71 which may be rocks, nuts, bolts, or other small parts or portions thereof, frequently may be found on aircraft runways despite efforts to keep the runways swept clean. If such items of loose surface debris as foreign objects 71 were disturbed by vertical lift discharge turbulence 52, then without the present jet screen they could be projected into air stream 58a and ingested in inlet 12, leading to potentially serious engine damage, especially serious because of the low velocity and proximity of aircraft 10 to landing surface 5 at the time the damage occurs. Using a jet screen, such loose surface debris that are disturbed by vertical lift discharge turbulence 52 and projected forward are then further projected downward against the runway surface and forward by jet screen 53 and away from inlet 12.

Figure 10:
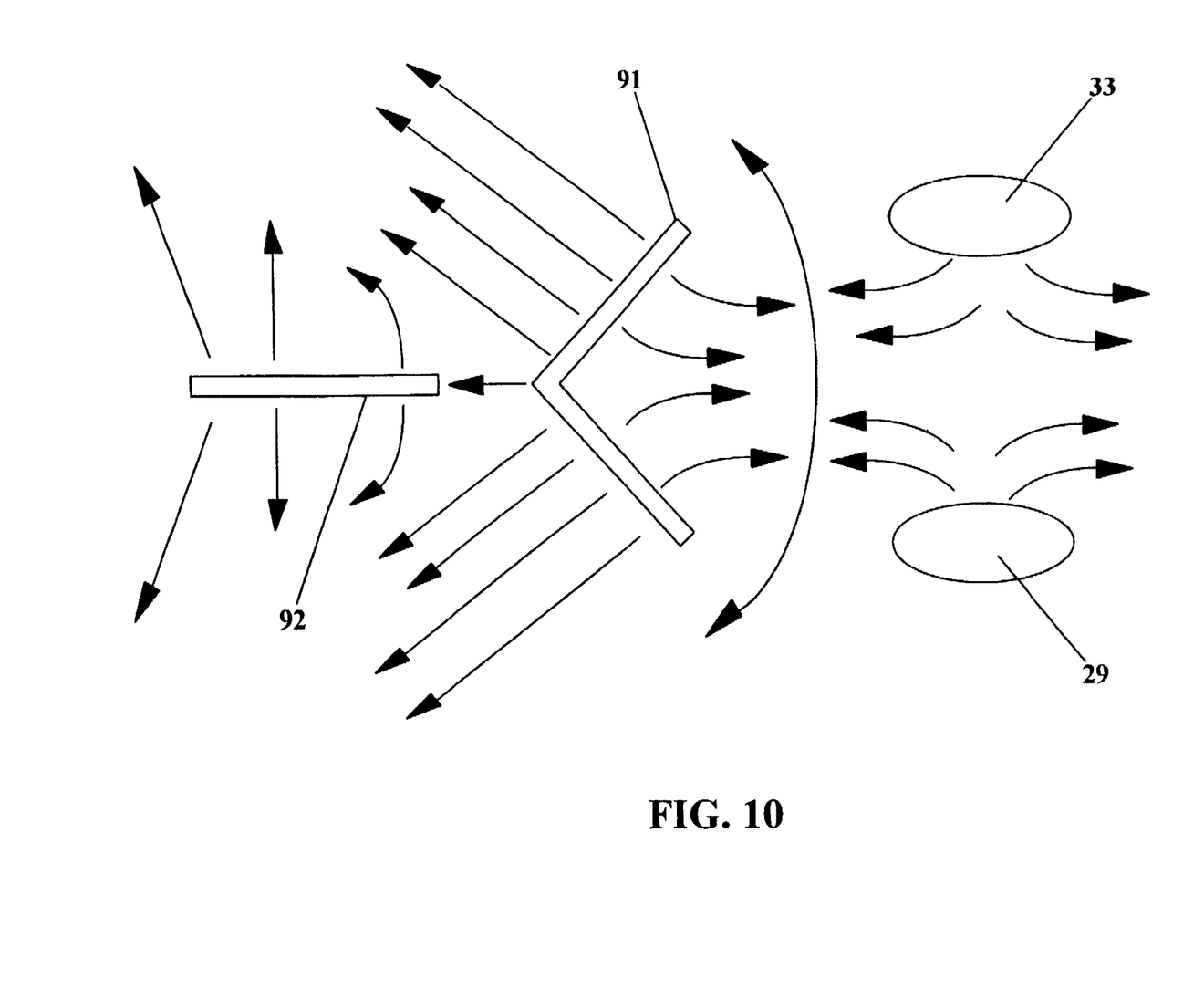
FIG. 10 is an alternate jet screen arrangement using a chevron shaped jet screen and auxiliary axial jet screen according to the invention, illustrating the predicted flow field.

In the case of chevron shaped jet screen 91 as shown in FIG. 10, air flow from jet screen 91 alone is directed initially vertically downward as it leaves nozzle 91, strikes the landing surface and spreads sideways relative to the major axis of the jet screen nozzle segment where it originated. Since both wings of jet screen nozzle 91 are angled aft, one to each side from a forward vertex, the air discharge striking the landing surface spreads forward and aft perpendicular to the angle of each wing of jet screen 91 from whence it came, causing foreign objects to be entrained and blown mostly to the side of aircraft 10, rather than merely forward. Because of the increased lateral separation between such blown foreign objects and the aircraft engine inlet, the chances of such foreign objects being later ingested are reduced from when a straight, mail slot type jet screen nozzle is used, and greatly reduced from when no jet screen at all is used.

This sideways blowing effect is enhanced if an auxiliary axial jet screen nozzle 92 is used in conjunction with the chevron jet screen nozzle. The auxiliary axial jet screen nozzle is set oriented with its major axis fore and aft and oriented to discharge vertically downward and further separate the chevron jet screen nozzle flow and force it even more to each side. Another benefit of the chevron jet screen nozzle 91 is that it makes the ground sheet of exhaust air from the main lift nozzles 29 and 33 that goes directly forward under the jet screen, much thinner than it would otherwise be if only a straight, mail slot type jet screen nozzle had been used and thereby reduces hot gas ingestion.

Yet another benefit of the chevron jet screen nozzle 91 is that the air flowing from it that strikes the ground and moves aft tends to converge because of the angles of the wing segments of the chevron jet screen nozzle, and this strengthens the fountain effect of main lift nozzle exhaust gases. Strengthening the fountain effect adds increased air pressure to the under side of aircraft 10 at a point further aft to help counter the aft pitch down effect, described below, resulting from atmospheric pressure on the aircraft upper surface, and reduced air pressure on the aft delta wing lower surface. Aft pitch down effect is a close to landing phenomenon caused when atmospheric air becomes entrained in lift nozzle exhaust, resulting in low pressure under parts of the aircraft. Thus, the chevron design jet screen nozzle such as nozzle 91, with or without an auxiliary axial jet screen nozzle, provides important advantages in a short and vertical landing and take off aircraft.

Figure 7:
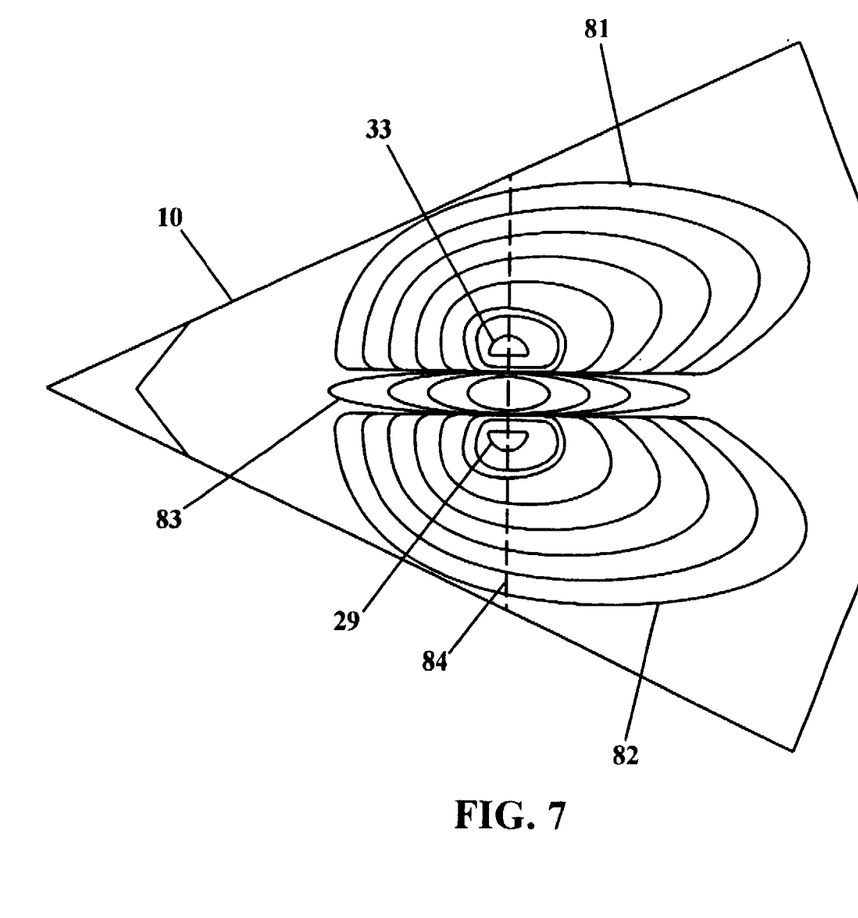
FIG. 7 is a bottom view of a vertical or short takeoff and landing aircraft illustrating the isobars of air pressure acting on the bottom, in accordance with the present invention.

FIG. 7 illustrates the isobars or lines of equal pressure that exist on the bottom surface of aircraft 10 while taking off, landing, or hovering in ground effect in the absence of a jet screen 53. Isobars 81 and 82 represent areas of lower than atmospheric pressure, while isobars 83 represent areas of higher than atmospheric pressure resulting from the fountain effect. Line 84 represents a line through the center of gravity about which aircraft 10 is caused to pitch by jet screen 53 and variable area pitch nozzle 36. The relatively larger area of the delta planform of aircraft 10, to the right of line 84, is affected by the area of reduced atmospheric pressure and is unable to resist the ambient atmospheric pressure on the upper surface of aircraft 10, resulting in the aft end of aircraft 10 pitching downward. Adding a jet screen 53, causes the fountain, as illustrated by isobars 83 to move further aft, thereby applying greater upward pressure to the bottom surface of aircraft 10 and countering some of the "aft pitch-down" effect.

An angle α (alpha) between jet screen 53 and perpendicular line 22' of approximately fifteen degrees appears optimum for a single, mail slot type jet screen nozzle to minimize or prevent hot gas and foreign body ingestion in inlet 12, although angles from approximately zero degrees to twenty degrees are also useful. As stated above, another benefit of jet screen 53 is that it raises the pressure on the bottom surface of aircraft 10 and causes isobars 83 from the fountain effect to move slightly aft, further increasing the pressurization on the bottom surface of aircraft 10 to counteract the atmospheric pressure on the top surface and thereby reduce the "aft pitch-down" tendency for aircraft 10 to pitch nose up when in ground effect and operating in the vertical takeoff and landing mode. Angles of α anywhere between 0 (zero) and at least 20 (twenty) degrees could be used; however, it has been found that for a single mail slot type jet screen nozzle, an angle of 15 degrees appears to be optimum for the aircraft design illustrated in FIG. 6. The chevron jet screen nozzle 83 on the other hand, appears optimum at a 0 (zero) degree angle relative to vertical. Specifying the optimum angle of α for a particular jet screen nozzle design in a particular aircraft design using a particular engine design will require testing to verify the optimum value.

Cruise nozzle 19 is variable in exit area and may be completely closed so that engine bypass duct and exhaust gases are diverted through main lift nozzles 29 and 33. When the aircraft has attained sufficient altitude, cruise nozzle 19 is opened while main lift nozzles 29 and 33 and jet screen nozzle 31 are closed to effect transition to forward motion flight operations aerodynamically supported by wings. In general, the opposite or reverse sequence is performed to go from forward motion flight to hover and landing.

Figure 8:
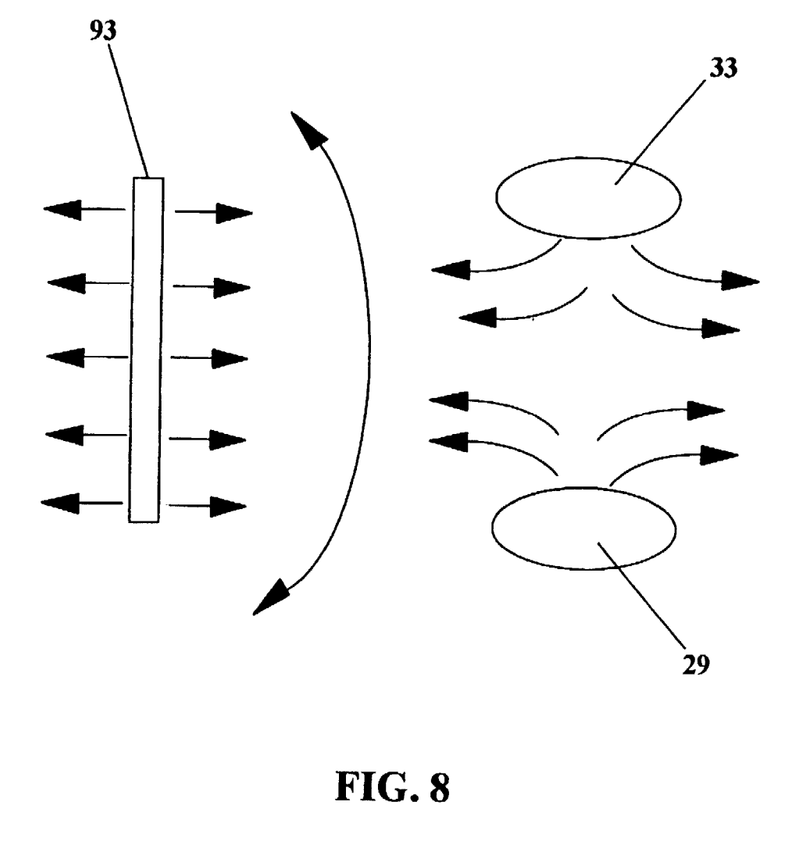
FIG. 8 is a jet screen arrangement according to the invention, illustrating the predicted flow field.
Figure 9:
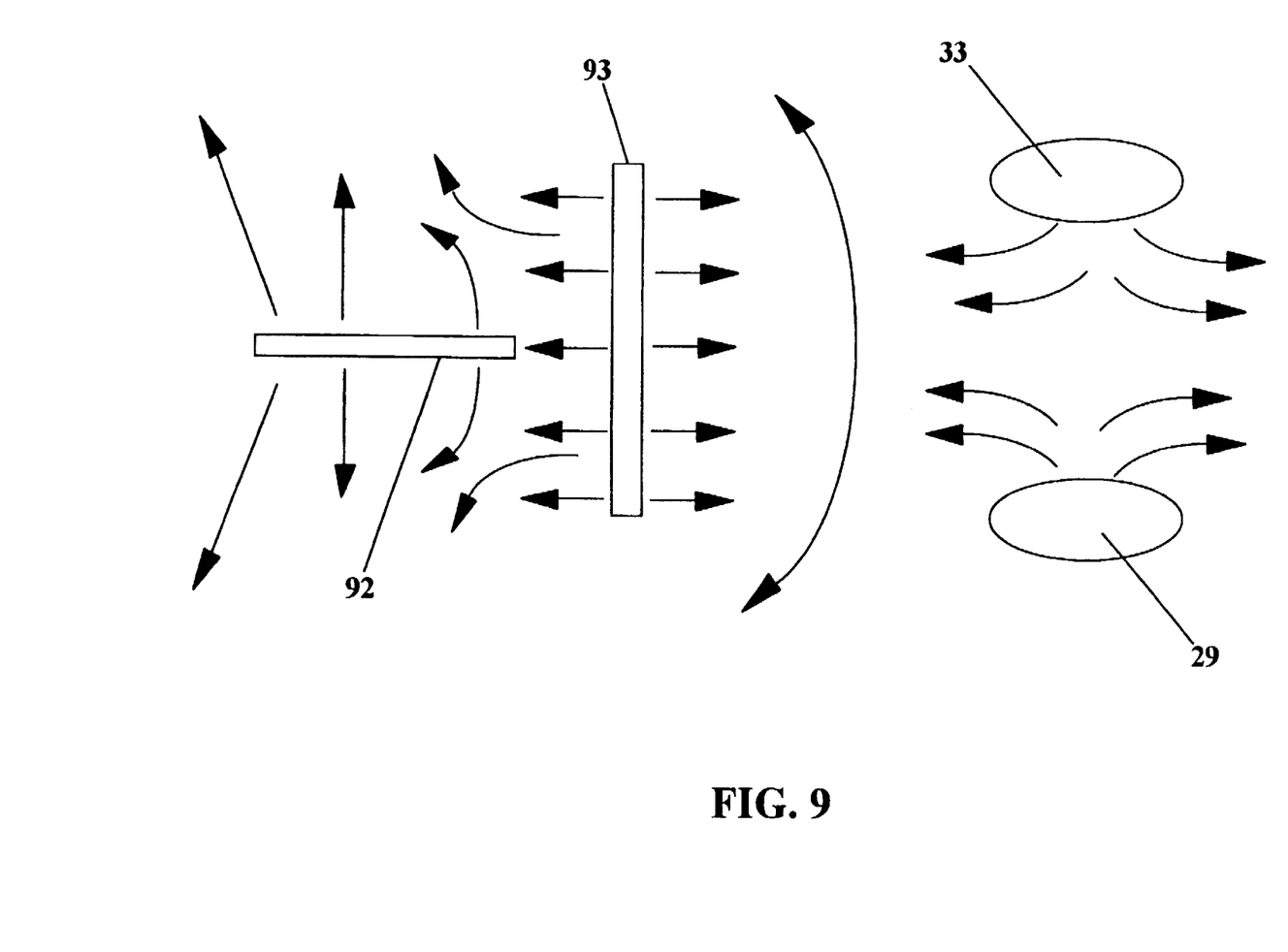
FIG. 9 is an alternate jet screen arrangement using an auxiliary axial jet screen according to the invention, illustrating the predicted flow field.

In FIGS. 8, 9 and 10, the flow arrows generally indicate the direction of flow of discharged gases. More accurately, the arrows indicate the horizontal component of gas flow velocity, since both the flow from the main lift nozzles and the flow from the jet screen nozzles will have a vertical as well as horizontal component. For simplicity, only horizontal components are shown.

FIG. 8 illustrates the predicted flow field resulting from interaction of flow from main lift nozzles 29 and 33 with flow from mail slot jet screen nozzle 93. This interaction establishes a barrier to forward flow of gases from main lift nozzles 29 and 33 that causes those gases to flow to either side of flow from jet screen nozzle 93, rather than directly forward.

FIG. 9 illustrates the flow field resulting from the addition of an auxiliary axial jet screen nozzle 92 positioned directly in front of jet screen nozzle 93 and oriented parallel with the longitudinal axis of the aircraft. Auxiliary axial jet screen nozzle 92 and jet screen nozzle 93 are supplied with bypass air, and are controlled in the same way previously described for jet screen nozzle 31. The effect of this arrangement is to cause flow from jet screen nozzle 93 to be forced even further to either side, establishing an even more effective barrier to forward flow of gases from main lift nozzles 29 and 33 and to deflect foreign objects strongly to the side away from the inlet. One added benefit of an auxiliary axial jet screen nozzle is that it is necessarily placed further forward relative to the center of gravity than is jet screen nozzle 93. This gains a larger moment arm relative to that center of gravity and consequently makes the auxiliary axial jet screen nozzle more effective at providing pitch control forces, for a given amount of bypass air discharge than is jet screen nozzle 93.

FIG. 10 illustrates the flow field resulting from a chevron shaped jet screen nozzle 91 coupled with an auxiliary axial jet screen nozzle 92 positioned directly in front of chevron shaped jet screen nozzle 91, and oriented with its major axis parallel with the longitudinal axis of the aircraft. Again, auxiliary axial jet screen nozzle 92 and jet screen nozzle 91 are supplied with bypass air. Because of the chevron shape of jet screen nozzle 91, a more simplified valving mechanism than used in jet screen nozzle 31 could be used to provide simple on and off functioning. Auxiliary axial jet screen nozzle 92 is equipped with a variable flow valving mechanism essentially the same as that previously described for use in jet screen nozzle 31 to provide variable pitch control. The effect of this arrangement is to cause flow from each side of jet screen nozzle 91, initially directed to each side of the aircraft, to be forced even further to either side, establishing an even more effective barrier to forward flow of gases from main lift nozzles 29 and 33. If a chevron shaped jet screen nozzle is used without a auxiliary axial jet screen nozzle, a variable discharge area valving mechanism could be used to control flow through the chevron shaped jet screen nozzle.

Figure 11:
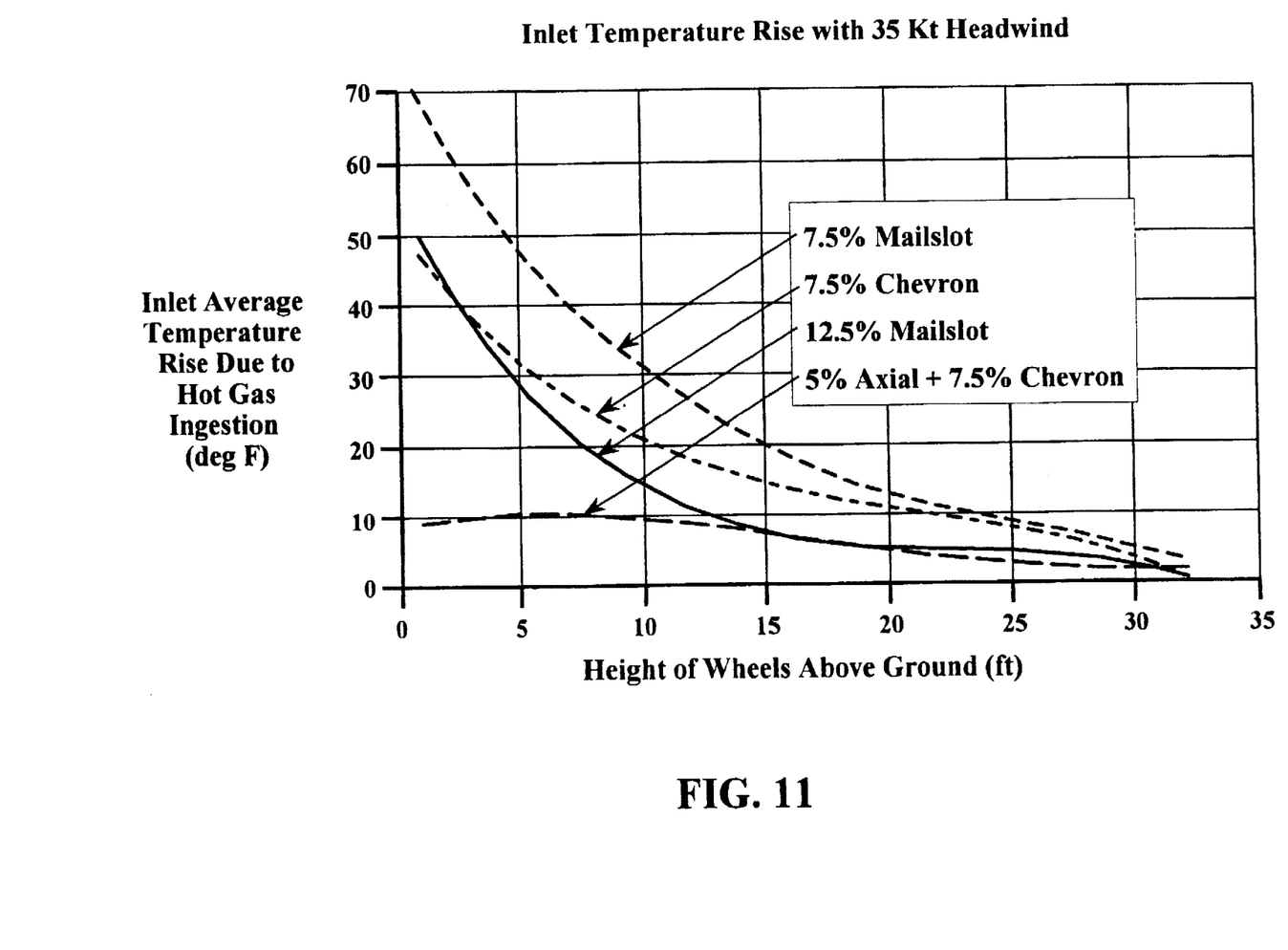
FIG. 11 is a graphical representation of the relative performance of various jet screen nozzle configurations plotted as Inlet Temperature Rise against Height of Wheels Above Ground.

FIG. 11 illustrates the relative performance of different jet screen nozzle configurations plotted as Inlet Average Temperature Rise Due To Hot Gas Ingestion (deg. F) versus Height of Wheels above Ground—Feet. This graph shows that adding an auxiliary axial jet screen nozzle to a chevron jet screen nozzle provides a tremendous improvement in lowering inlet average temperature rise for wheel heights above ground at almost all altitudes of interest.

Of course the purpose of each of the arrangements shown in FIGS. 8, 9 and 10 is to reduce or prevent engine ingestion of hot exhaust gases discharged through main lift nozzles 29 and 33 over a wide variety of flight regimes while still providing effective pitch control. These jet screen arrangements, in varying degrees of effectiveness, cause hot main lift nozzle exhaust discharge gases to form a ground sheet that sweeps forward and to the sides, before eventually rising to the point where it could drift back toward the aircraft and be ingested by the engine. Before much hot exhaust gas is ingested, the aircraft should have its wheels on the landing surface, so that perfect flow control of such gases, though desirable, is not absolutely necessary.

Depending upon the actual aircraft aerodynamic and propulsion system dimensions and characteristics, control system 61 is supplied with appropriate control laws and constant or variable values to enable it to exert meaningful control of the aircraft, though the exact laws, constants and variables may be different for different actual aircraft and aircraft types. Also, the jet screen nozzle could also assume other shapes than straight or chevron ("V") shaped, such as round, oval or semicircular, in appropriate applications.

Addition of an auxiliary axial jet screen will require dividing the available bypass air between two jet screen nozzles rather than one. Actual percentages of available thrust used by the jet screen nozzle will depend upon the precise aircraft and engine design in which the jet screen nozzle arrangement is installed. As an example of actual thrust figures for an actual design, without an auxiliary axial jet screen nozzle, the single jet screen nozzle will discharge from 7.5% to 18% of the available thrust from bypass air, being set at about 12.5% of available thrust most of the time it is in use for flight operations. The auxiliary axial jet screen nozzle will receive air from manifolding similar to the bypass duct offtake 23 and will discharge air initially vertically downward, although as the air is acted upon by other forces and flows its direction will change.

The auxiliary axial jet screen nozzle will share available bypass air with the main jet screen nozzle, the total mass flow of air being approximately the same as flowed previously from a single jet screen nozzle. In an actual aircraft design, if an auxiliary axial jet screen nozzle is used with a chevron shaped jet screen nozzle, the auxiliary axial jet screen nozzle will discharge air in the range of from 0% to 11% of available thrust, while the chevron jet screen nozzle itself may be equipped to discharge a fixed 7.5% of available thrust. In this case, the chevron jet screen nozzle portion of the system would be equipped with a simple open and close shut off valve where there is no need to meter the flow rate at positions between full open and closed. The auxiliary axial jet screen nozzle would have the variable valving to enable modulating pitch control.

Aircraft forward speed as well as the velocity of any head wind appear to be significant factors in how effective these jet screen arrangements are at accomplishing their objectives. At low forward speed in calm air, the main lift nozzle discharge forms a ground sheet that sweeps well forward of the aircraft, allowing time for these gases to cool, dilute and mix in the oxygen rich ambient air. At combined aircraft forward speed and head wind velocity of 20 to 30 knots, there is less time for mixing, and the gases rise closer to the engine inlet, leading to greater chance of hot exhaust gas ingestion. At higher combined forward speed and head winds of approximately 50 knots, the rising gases are already swept aft of the engine inlet when they rise, and pose significantly less threat of being ingested. The optimum jet screen arrangement will minimize the potential for hot exhaust gas ingestion over the widest range of flight conditions for a particular aircraft, and operational experience may dictate a preferred landing procedure.

In operation, prior to takeoff the operator starts gas turbine engine 13. This could be done with cruise nozzle 19 open and main lift nozzles 29 and 33 closed, or with cruise nozzle 19 closed and main lift nozzles 29 and 33 open. When engine 13 has reached its normal operating condition the operator closes cruise nozzle 19 and at the same time opens main lift nozzles 33 and 29, and jet screen nozzle 31 if they are not already in that position. Variable area pitch nozzle 36 becomes active to balance pitching forces provided by jet screen nozzle 31, and is available should there be any maneuvering commands which require its operation. Other control nozzles for roll and yaw control also are enabled and await control commands.

When engine 13 has developed sufficient power to begin the takeoff, most of the bypass air and the engine exhaust gases are diverted and discharged through main lift nozzles 29 and 33, while a portion of the bypass air is diverted and discharged through jet screen nozzle 31. As aircraft 10 begins to lift off landing surface 5, any nose-down pitch requirements commanded by the operator will cause control system 61 to send appropriate signals to actuator 28 on jet screen nozzle 31 and to variable area pitch nozzle 36 to enable pitch nozzle 36 to provide discharge and accompanying negative pitch moment. The same is true of positive pitch moments where control system 61 closes variable area pitch nozzle 36 and allows jet screen nozzle 31 to apply a greater positive pitch moment to aircraft 10, causing the nose of aircraft 10 to rise.

As aircraft 10 rises out of ground effect and away from landing surface 5, the need for jet screen nozzle 31 diminishes. As aircraft 10 gains altitude, main lift nozzles 29 and 33 are swiveled to their aft most position and aircraft 10 begins to accelerate horizontally forward. At a preselected forward velocity, when wing aerodynamic lift is sufficient to support aircraft 10, main lift nozzles 29 and 33 are closed and cruise nozzle 19 opened to produce forward thrust. At this point, main lift nozzles 29 and 33, and jet screen nozzle 31 have been closed so that all bypass air and exhaust gases are discharged through cruise nozzle 19. Also, the nozzles that provide yaw and roll control are closed so that all pitch, yaw and roll forces are now coming from deflection of aerodynamic control surfaces into the air stream, rather than as reaction forces to nozzle discharge.

During the initial phase of takeoff, vertical lift discharge turbulence 52 flows up against the bottom surface of aircraft 10 as fountain flow 59 and increases slightly the pressure on the bottom surface of aircraft 10. Lift improvement devices positioned in the vicinity of main lift nozzles 29 and 33, serve to separate fountain flow 59 from the bottom surface of aircraft 10 and redirect fountain flow 59 back toward landing surface 5.

Of course, auxiliary systems similar to those described also provide for yaw and roll control of aircraft 10 while in the vertical or short takeoff and landing mode in ground effect near landing surface 5. Gas flow through the variable area pitch nozzle 36 and the other roll and yaw control nozzles is also a mixture of exhaust and bypass air.

Normally, operation of an aircraft such as aircraft 10 hovering, taking off or landing, while close to the ground and especially such operation in a military role, creates the need for immediate aircraft response in case of emergency. This means that while so operating, the engine rotational speed should be kept near the speed corresponding to the maximum power level. In order to accomplish this, the engine is accelerated to the appropriate speed but the flow discharge area of the engine is opened larger and fuel metering reduced to reduce thrust. This way, in case of emergency, the discharge area can be quickly reduced at the same time more fuel is applied to the engine to produce immediate thrust increase without the need to wait for the rotating components of the jet engine to reach a higher rotational speed. This provides a margin of safety for the operator in case of emergency.

Essentially the reverse of the take off procedure may be used when landing. Aircraft 10 slows its forward velocity until at a preselected velocity, cruise nozzle 19 is closed and main lift nozzles 29 and 33 opened, and other control nozzle systems activated to await control commands. The aircraft slows to low horizontal speed, or comes to a complete stop, and then hovers lower until aircraft 10 landing gear contact the landing surface. Alternatively, aircraft 10 could land in the conventional manner on a sufficiently long runway without ever activating its main lift nozzles or pitch, roll or yaw systems.

It is to be understood that the present invention is not limited to the particular arrangement and embodiments of parts or processes disclosed and illustrated herein, nor to the materials specified. It is intended that all matter contained in the foregoing description or shown in the accompanying drawing shall be interpreted as illustrative and not limiting. Other improvements, modifications and embodiments will become apparent to one of ordinary skill in the art upon review of this disclosure. Such improvements, modifications and embodiments are considered to be within the scope of this invention. Therefore, the present invention embraces all such modified forms thereof as come within the scope of the following claims.

What is claimed is:

1. An aircraft engine inlet exhaust gas and foreign body ingestion reduction and aircraft pitch control system for use in a vertical and short takeoff and landing aircraft utilizing a high pressure ratio bypass jet engine defining a longitudinal axis, and including an air inlet for ducting air to the engine, said engine having first and second stage compressors, a bypass duct communicating with the area between said first stage compressor and said second stage compressor and conducting compressed bypass air therefrom to a point aft of the engine, a plenum attached aft of said engine for receiving said bypass air and exhaust gases, a tailpipe attached aft of said plenum, a selectively closable cruise nozzle attached to the aft end of said tailpipe and two controllable lift nozzles positioned in said plenum for selectively diverting mixed engine exhaust gas and bypass air downwardly in a lift column, said aircraft engine inlet exhaust gas and foreign body ingestion reduction and pitch control system comprising:

a bypass duct offtake attached to said bypass duct and mounted forward of said two lift nozzles, for diverting a portion of compressed air flow from said bypass duct;

a jet screen nozzle connected to said bypass duct offtake to receive bypass air from said bypass duct offtake and discharge said bypass air as a jet screen;

a pitch nozzle attached to said tailpipe and oriented to selectively discharge exhaust gases to provide the aircraft a negative pitching moment in response to control commands; and a control system connected to control area pitch nozzle, and said jet screen nozzle for differentially opening and closing said pitch nozzle and said jet screen nozzle to generate positive and negative aircraft pitching moments in response to operator commands while maintaining the total discharge flow area of the high pressure ratio bypass jet engine substantially constant.

2. An aircraft engine inlet ingestion reduction and pitch control system as set forth in claim 1, wherein said jet screen nozzle is a single shutoff, variable area, jet screen nozzle.

3. An aircraft engine inlet ingestion reduction and pitch control system as set forth in claim 2, wherein said single shutoff, variable area, jet screen nozzle is a two dimensional nozzle having a rectangular flow area and further comprises a stationary forward lip, stationary right and left sidewalls, and an aft lip incrementally moveable between said sidewalls from a closed position against said forward lip through a range of partially open positions to a fully open position, and an actuator attached to said aft lip and adjacent aircraft structure for incrementally moving said aft lip between said closed and open positions in response to commands from said control system.

4. An aircraft engine inlet ingestion reduction and pitch control system as set forth in claim 2, wherein said single shutoff, variable area, jet screen nozzle has its major axis oriented substantially transverse to said bypass jet engine longitudinal axis.

5. An aircraft engine inlet ingestion reduction and pitch control system as set forth in claim 2, wherein said single shutoff, variable area, jet screen nozzle produces supersonic flow when operating with said aft lip in an open position.

6. An aircraft engine inlet ingestion reduction and pitch control system as set forth in claim 2, wherein said single shutoff, variable area, jet screen nozzle is oriented to discharge said jet screen of bypass air downwardly and forwardly in a direction between five and twenty degrees forward from perpendicular to the bypass jet engine longitudinal axis.

7. An aircraft engine inlet ingestion reduction and pitch control system as set forth in claim 2, wherein said single shutoff, variable area, jet screen nozzle is oriented to discharge a jet screen of bypass air from said bypass in a direction downwardly and fifteen degrees forwardly from perpendicular to the bypass jet engine longitudinal axis.

8. An aircraft engine inlet ingestion reduction and pitch control system as set forth in claim 2, and further comprising a plurality of deployable lift improvement devices positioned on the lower surface of said aircraft for controlled movement between retracted and extended positions, and operable in the extended position as air dams to control the flow of fountain column air against said aircraft lower surface.

9. An aircraft engine inlet ingestion reduction and pitch control system as set forth in claim 8, wherein said plurality of deployable lift improvement devices comprises right and left aft lift improvement devices, right and left forward lift improvement devices, and a front lift improvement device, said right and left forward and right and left aft lift improvement devices being aligned with one another on each side respectively parallel to the bypass jet engine longitudinal axis, each of said right and left lift improvement devices being aligned parallel and spaced apart from one another both forward and aft respectively, and said front lift improvement device being positioned transverse to said bypass jet engine longitudinal axis and extending from the front of said right forward lift improvement device to the front of said left forward lift improvement device, each of said right and left lift improvement devices being positioned on the bottom of said aircraft inboard of said controllable lift nozzles and extending aft from said front lift improvement device.

10. An aircraft engine inlet ingestion reduction and pitch control system as set forth in claim 9, wherein said right and left forward, right and left aft and front lift improvement devices each comprise a substantially rectangular panel mounted on hinges attached to the aircraft for movement between a retracted position conformal to the aircraft exterior surface and a deployed position forming an air dam, on command of an operator, and where said front lift improvement device covers said single shutoff, variable area, jet screen nozzle in the retracted position.

11. An aircraft engine inlet ingestion reduction and pitch control system as set forth in claim 1, further comprising an auxiliary axial jet screen nozzle controlled by said control system.

12. An aircraft engine inlet ingestion reduction and pitch control system as set forth in claim 1, further comprising said jet screen nozzle having a chevron configuration defined by two angled sides of the jet screen nozzle meeting at an apex on the centerline of the aircraft and each angled side being directed to the side and aft for producing a jet screen having a lateral velocity component imparted by the jet screen nozzle.

13. An aircraft engine inlet exhaust gas and foreign body ingestion reduction and aircraft pitch control system as set forth in claim 1, further comprising said jet screen nozzle having a chevron shape having the apex of the chevron forward and near the centerline of the aircraft, and further defined by two angled nozzle segments each depending from that apex in a direction toward each side and aft, said jet screen nozzle further including valve means for opening and closing said nozzle.

14. An aircraft engine inlet exhaust gas and foreign body ingestion reduction and aircraft pitch control system as set forth in claim 13, and further comprising an auxiliary axial jet screen nozzle connected to said bypass duct for receiving compressed air therefrom and defined by a two dimensional rectangular nozzle having a length dimension and a width dimension, the length dimension being greater than the width dimension, wherein the axial nozzle length is aligned parallel with the longitudinal centerline of the aircraft, and said auxiliary axial jet screen nozzle is positioned in front of said chevron jet screen nozzle and aligned with said apex, for discharging compressed air.

15. An aircraft engine inlet exhaust gas and foreign body ingestion reduction and aircraft pitch control system as set forth in claim 14 wherein said auxiliary axial jet screen nozzle has a valve movable between full on and full off positions for controlling compressed air flow through said nozzle.

16. An aircraft engine inlet exhaust gas and foreign body ingestion reduction and aircraft pitch control system as set forth in claim 14 wherein said auxiliary axial jet screen nozzle has a valve incrementally adjustable between full on and full off positions for incrementally controlling compressed air flow through said nozzle.

* * * * *